(12) United States Patent
Humphrey et al.

(10) Patent No.: US 9,970,767 B2
(45) Date of Patent: May 15, 2018

(54) STABILIZATION BASED PATH PLANNING

(71) Applicant: Caterpillar Inc., Peoria, IL (US)

(72) Inventors: James D. Humphrey, Decatur, IL (US); Andrew J. Vitale, Edwards, IL (US); Joshua Struble, Chillicothe, IL (US); Bryan Everett, Washington, IL (US)

(73) Assignee: Caterpillar Inc., Deerfield, IL (US)

( * ) Notice: Subject to any disclaimer, the term of this patent is extended or adjusted under 35 U.S.C. 154(b) by 245 days.

(21) Appl. No.: 14/861,437

(22) Filed: Sep. 22, 2015

(65) Prior Publication Data

US 2017/0084171 A1    Mar. 23, 2017

(51) Int. Cl.
| | | |
|---|---|---|
| G01C 21/16 | (2006.01) | |
| G05D 1/02 | (2006.01) | |
| E21F 17/18 | (2006.01) | |

(52) U.S. Cl.
CPC ............ G01C 21/165 (2013.01); E21F 17/18 (2013.01); G05D 1/0214 (2013.01); G05D 2201/021 (2013.01)

(58) Field of Classification Search
None
See application file for complete search history.

(56) References Cited

U.S. PATENT DOCUMENTS

| | | | |
|---|---|---|---|
| 4,831,539 A | 5/1989 | Hagenbuch | |
| 7,844,380 B2 | 11/2010 | Han et al. | |
| 8,275,516 B2 | 9/2012 | Murphy | |
| 8,818,699 B2 | 8/2014 | Nichols et al. | |
| 9,761,137 B2 * | 9/2017 | Beaurepaire | G08G 1/096805 |
| 2007/0006652 A1 | 1/2007 | Weldon, Jr. et al. | |
| 2009/0037049 A1 * | 2/2009 | Clodfelter | A01B 63/00 701/36 |
| 2012/0239588 A1 * | 9/2012 | Sujan | G06Q 10/047 705/338 |
| 2013/0311153 A1 | 11/2013 | Moughler et al. | |
| 2014/0188375 A1 * | 7/2014 | Kumar | B60L 15/38 701/117 |
| 2014/0316618 A1 * | 10/2014 | Matthews, Jr. | B60L 15/38 701/19 |
| 2015/0168158 A1 * | 6/2015 | Mathews, Jr. | G01C 21/26 701/400 |

(Continued)

FOREIGN PATENT DOCUMENTS

| | | |
|---|---|---|
| EP | 1813510 B1 | 8/2009 |
| EP | 2273334 A1 | 1/2011 |
| WO | 03021190 A1 | 3/2003 |

*Primary Examiner* — Shelley Chen
(74) *Attorney, Agent, or Firm* — Miller, Matthias & Hull

(57) ABSTRACT

A method for controlling a mining truck travelling on a work site is disclosed. The method includes receiving payload information associated with a payload carried in a bed of the mining truck from sensors associated with the mining truck. The method further includes determining an imbalance of the payload based on the payload information. The method further includes receiving positioning data associated with the work site from a positioning system and determining an approaching terrain of the work site based on the positioning data. The method further includes planning a path for the mining truck based on the imbalance and the approaching terrain and controlling the mining truck based on the path.

20 Claims, 4 Drawing Sheets

(56) References Cited

U.S. PATENT DOCUMENTS

| | | | |
|---|---|---|---|
| 2015/0264866 A1* | 9/2015 | Foster | A01B 69/004 412/21 |
| 2016/0185326 A1* | 6/2016 | Brooks | B60T 8/171 701/19 |
| 2016/0318532 A1* | 11/2016 | Brooks | B61L 27/0027 |
| 2017/0069209 A1* | 3/2017 | Beaurepaire | G08G 1/096805 |

* cited by examiner

STABILIZATION BASED PATH PLANNING

TECHNICAL FIELD

The present disclosure generally relates to control systems for mining trucks and, more particularly, relates to systems and methods for controlling mining trucks based on imbalance of a payload carried by the mining truck.

BACKGROUND

Mining trucks are, generally, used at mining sites to move large quantities of materials from one area of a worksite to another. Large scale mining operations may employ a fleet of mining trucks to achieve mining production targets in shorter periods of time, wherein each truck hauls a large payload of materials during each trip. Of course, to increase productivity, efficiency, and profitability, trucks able to haul increasingly sized payloads are desired at the worksite. However, a large payload may create stability concerns for the truck.

To increase productivity of a fleet of mining trucks on a worksite where each truck hauls a large payload, autonomous and/or semi-autonomous control systems and methods may be employed. Autonomous or semi-autonomous control has been used to improve efficiency on a variety of work sites. For example, U.S. Pat. No. 8,275,516 ("Agricultural Vehicle Autopilot Rollover Risk Assessment System") details a control system for agricultural equipment which may warn an operator of a risk of machine roll over, particularly when the agricultural equipment is turning, during manual, semi-autonomous, or autonomous operation.

However, when a machine, such as a mining truck, is configured to haul a large payload, a number of unique factors arise during path planning, which are not present in path planning for other machines, like, for example, the agricultural equipment of the '516 patent. Particularly, in large mining trucks, the payload can be loaded in the bed or body of the truck in such a way that the center of mass of the payload may be off-center.

If the center of mass is off-center, then stability of the mining truck may be affected. In certain situations, if a truck is travelling on a cross sloping road, a control system that only plans a path based on information that only accounts for a centered load may give rise to productivity loss. If the control system sets the path conservatively, the efficiency and/or effectiveness of the haul of the truck may be reduced.

Therefore, systems and methods for controlling path planning of a mining truck, based on payload imbalance, are desired.

SUMMARY

In accordance with one aspect of the disclosure, a method for controlling a mining truck travelling on a work site is disclosed. The method may include receiving payload information associated with a payload carried in a bed of the mining truck from sensors associated with the mining truck. The method may further include determining an imbalance of the payload based on the payload information. The method may further include receiving positioning data associated with the work site from a positioning system and determining an approaching terrain of the work site based on the positioning data. The method may further include planning a path for the mining truck based on the imbalance and the approaching terrain and controlling the mining truck based on the path.

In accordance with another aspect of the disclosure, a system for controlling a mining truck, having a bed and traveling on a work site, is disclosed. The system may include sensors operatively associated with the mining truck and configured to determine payload information associated with a payload carried in the bed of the mining truck. The system may further include a positioning system configured to determine positioning data associated with one or both of the mining truck and the work site. The system may further include a mining truck controller configured to receive the payload information from the sensors, determine an imbalance of the payload based on the payload information, and receive the positioning data from the positioning system. The mining truck controller may further be configured to determine an approaching terrain of the work site based on the positioning data, plan a path for the mining truck based on the imbalance and the approaching terrain, and control the mining truck based on the path.

In accordance with yet another aspect of the disclosure, a mining truck is disclosed. The mining truck may include a bed, a prime mover, a plurality of wheels, and one or more system sensors operatively associated with the mining truck and configured to determine payload information associated with a payload carried in the bed. The mining truck may further include a mining truck controller configured to receive the payload information from the sensors, determine an imbalance of the payload based on the payload information, and receive the positioning data from the positioning system. The mining truck controller may further be configured to determine an approaching terrain of the work site based on the positioning data, plan a path for the mining truck based on the imbalance and the approaching terrain, and control the mining truck based on the path.

DETAILED DESCRIPTION

Figure 1:
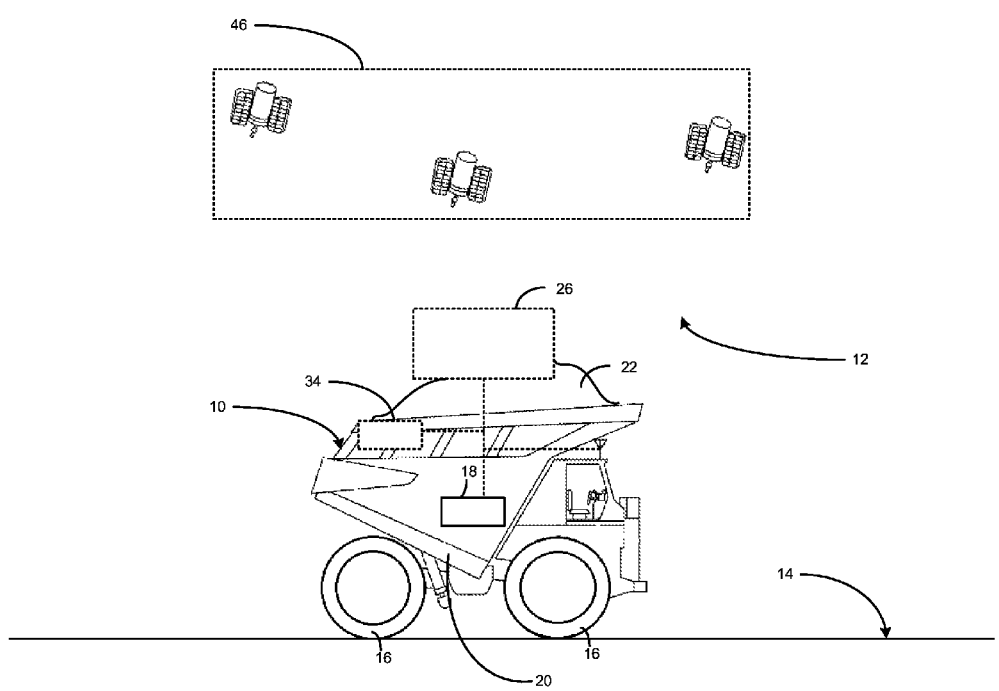
FIG. 1 is a side view of a mining truck and an associated system for monitoring and controlling the mining truck, in accordance with an embodiment of the disclosure.

Turning now to the drawings and with specific reference to FIG. 1, a mining truck 10 and a control system 12 for monitoring and controlling operations of the mining truck 10 on a work site 14 are shown. In the illustrated embodiment, the mining truck 10 can be any truck used on the work site 14 for large scale material movement and generally includes a plurality of wheels 16, a prime mover 18, and a bed 20 for carrying a payload 22. The prime mover 18 may provide power to propel the mining truck 10 using the wheels 16, or any other suitable traction device. Additionally, the prime mover 18 may be configured to raise and lower the bed 20. Control of propulsion, steering, and any working functions (e.g., raising and lowering the bed 20) may be performed using the control system 12.

Figure 2:
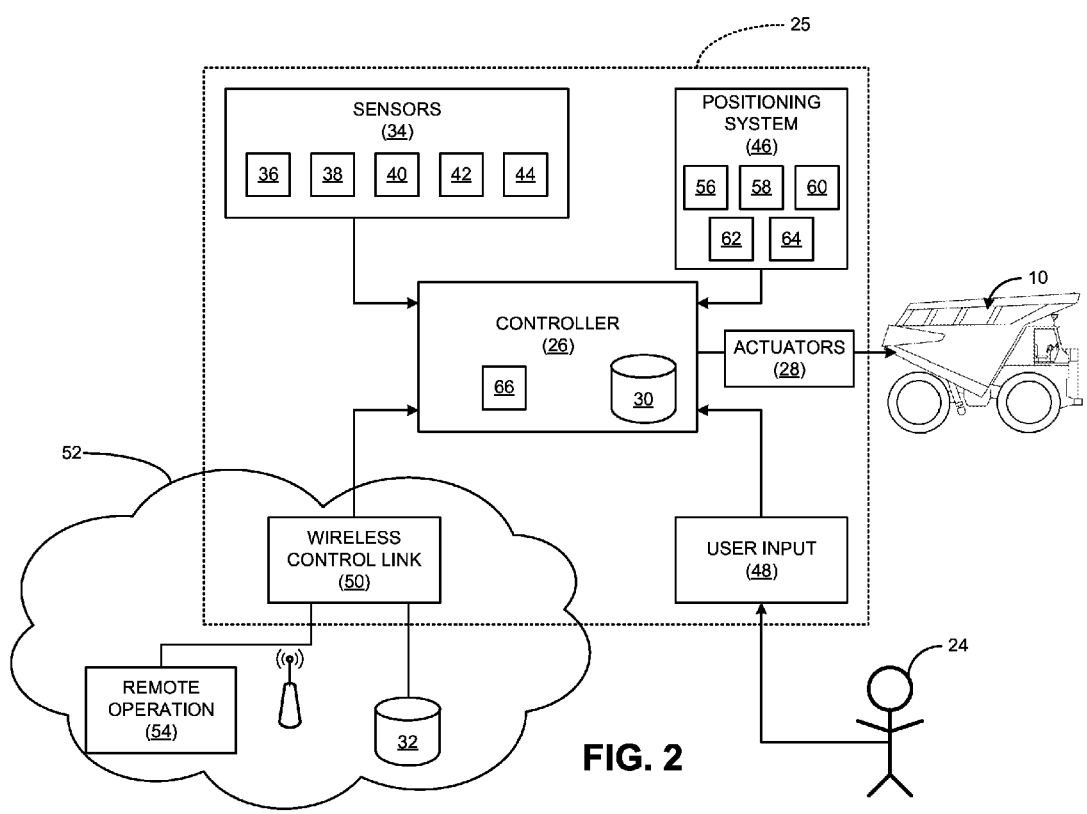
FIG. 2 is a schematic diagram of the system for monitoring and controlling the mining truck of FIG. 1, in accordance with the embodiment of FIG. 1.

While the connections between elements of the control system 12 are best shown in the schematic view of FIG. 2, some elements are also represented in FIG. 1 and denoted, schematically, by boxes associated with each of the plurality of mining trucks 10. The control system 12 may be used to control the mining truck 10 in a variety of autonomous, semi-autonomous, or manual modes. As used herein, the mining truck 10 operating in an autonomous manner operates automatically based upon information provided by the control system 12, without the need for human operator input. Further, the mining truck 10 operating semi-autonomously involves an operator, either within the mining truck 10 or remotely, who performs some tasks or provides some input while other tasks are performed automatically based upon information provided by the control system 12. If the mining truck 10 is operating manually, an operator is controlling all or essentially all of the direction, speed, and manipulating functions of the mining truck 10.

Referring now to FIG. 2 and with continued reference to FIG. 1, a schematic diagram of the control system 12 is shown. While the connections between elements of the control system 12 are best shown in the schematic depiction of FIG. 2, some elements are also represented in FIG. 1 and denoted, schematically, by boxes having dotted lines.

Operation of the mining truck 10, in any of the above referenced manners, may be executed by a mining truck controller 26. The mining truck controller 26 may be any electronic controller or computing system including a processor which performs operations, executes control algorithms, stores data, retrieves data, gathers data, actuates actuators 28 associated with the mining truck 10 and/or performs any other computing or controlling task desired. The mining truck controller 26 may be a single controller or may include more than one controller disposed to control various functions and/or features of the mining truck 10. Functionality of the mining truck controller 26 may be implemented in hardware and/or software and may rely on one or more data maps relating to the operation of the mining truck 10. To that end, the mining truck controller 26 may include internal memory 30 and/or the mining truck controller 26 may be otherwise connected to external memory 32, such as a database or server. The internal memory 30 and/or external memory 32 may include, but are not limited to including, one or more of read only memory (ROM), random access memory (RAM), a portable memory, and the like. Such memory media are examples of nontransitory memory media.

For determining characteristics associated with the mining truck 10, including those characteristics associated with the payload 22, the mining truck controller 26 may be operatively associated with one or more sensors 34. The term "sensor" is used in its broadest sense to include one or more sensors and related components that may be associated with the mining truck 10 and that may operate to sense functions, operations, and/or operating characteristics of the mining truck 10. The sensors 34 may provide data, either directly or indirectly, which is indicative of various parameters and conditions associated with the mining truck 10. As shown, the sensors 34 include tire pressure sensors 36, suspension system pressure sensors 38, a payload monitoring system 40, engine speed sensor(s) 42, and accelerometer(s) 44. Further, the sensors 34 are not limited to including the referenced sensors and may include any other sensors useful for providing information associated with conditions of the mining truck 10 to the mining truck controller 26.

The tire pressure sensors 36 and suspension system pressure sensors 38 may be used to, respectively, determine tire pressure of tires associated with the wheels 16 and determine suspension system pressures associated with a suspension of the mining truck 10. By utilizing the pressure calculations, the mining truck controller 26 may derive information associated with the payload 22, such as the location of a center of mass of the payload 22. For example, the mining truck controller 26 may examine a difference in pressures on opposing sides of the truck to determine an imbalance caused by the payload.

Payload information may also be gathered by utilizing the payload monitoring system 40. The payload monitoring system 40 may be any collection of sensors disposed proximate to the payload 22 that gather information associated with the weight, height, position, or consistency of the payload 22. For example, the payload monitoring system 40 may include a plurality of pressure pads and/or pressure sensors disposed on or beneath the bed 20. Such a plurality of pressure pads and/or sensors may then determine the weight of the payload 22 at specific locations on the bed 20. This weight information can then be utilized by the mining truck controller 26 to determine payload information, such as the center of mass of the payload 22.

Furthermore, the machine speed sensor 42 may be utilized to determine speed information associated with the mining truck 10, which may then be used in path planning. The accelerometer 44 is useful for determining acceleration of the mining truck 10 along various axes of operation, which may also be valuable during path planning by the mining truck controller 26.

The control system 12 may also include a positioning system 46 for monitoring and/or controlling movement of the mining truck 10, which may include, for example a global positioning system ("GPS"), a global navigation satellite system (GNSS), an inertial guidance system, and/or a vision system of lasers or cameras. The positioning system 46 may sense the position of the mining truck 10 relative to the associated work site 14. The positioning system 46 may include a plurality of individual sensors that cooperate to provide signals to the mining truck controller 26 to indicate the position of the mining truck 10 and/or map characteristics of a work surface, such as topography of the work site 14. Using the positioning system 46, the controller may determine the position of the mining truck 10 within the work area as well as determine the orientation of the mining truck 10. With said information, dimensions of the mining truck 10 and/or the associated work site 14 may be stored by the control system 12 with the positioning system 46 defining a datum or reference point on the mining truck 10 and the controller using the dimensions to determine a position of the terrain or work surface upon which the mining truck 10 is operating.

User input 48 may be included with the control system 12 so that the operator 24 may have the ability to operate the machine. For example, user input 48 may be provided in a cab of the mining truck 10, wherein the operator 24 may provide commands when the mining truck 10 is operating in either a manual or semi-autonomous manner. The user input 48 may include one or more input devices through which the operator 24 may issue commands to control the propulsion and steering of the mining truck 10 as well as operate various implements associated with the mining truck 10.

Additionally or alternatively, the control system 12 may include a wireless control link 50 which is connected to a wireless network 52. Via the wireless control link 50, commands may be given to the mining truck 10 via the mining truck controller 26 from a remote operation 54 (e.g., a command center, a foreman's station, and the like). Further, information may be accessed from and/or stored to the external memory 32. In certain embodiments, control of the mining truck 10 via the control system 12 may be distributed such that certain functions are performed at the mining truck 10 and other functions are performed via remote operation 54.

As mentioned above, the positioning system 46 may be employed to determine an actual profile of a work surface to be used in a work plan. The positioning system 46 may include one or more GPS sensors 56 for detecting locations of the mining truck 10 or one or more elements of the mining truck 10 relative to the work site 14. Other elements of the positioning system 46 may include, but are not limited to including, odometers 58, wheel rotation sensing sensors 60, perception based system sensors 62, and laser position detection systems 64. All elements of the positioning system 46 may be used to determine the real time actual profile of the work surface to be used for analysis by the control system 12. Of course, other elements aiding in detecting positioning of the mining truck 10 or the work site 14 may be included and input from the sensors 34 may also be used in determining the actual profile of the work surface.

Figure 3:
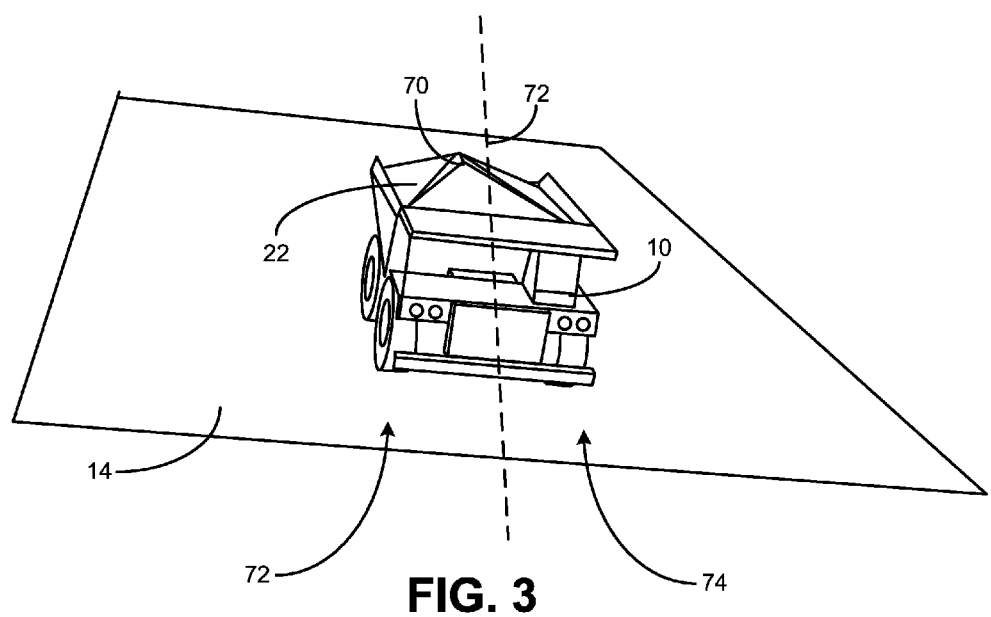
FIG. 3 is a three-dimensional depiction of a mining truck hauling an imbalanced payload on a side sloping surface of a work site, in accordance with an aspect of the disclosure.

By utilizing the mining truck controller 26 and other elements of the control system 12, steering and propulsion of the mining truck 10 may be controlled based on the payload 22. For example, the mining truck controller 26 may generate a path plan 66, based on data from the positioning system 46 and the sensors 34, for controlling the mining truck 10 in view of characteristics of the payload 22. As illustrated in the three-dimensional view of the mining truck 10 travelling on the work site 14 of FIG. 3, the payload 22 may have a center of mass 70 that is off-center relative to the mining truck 10. As shown, the center of mass 70 is off-center relative to a center line 72 associated with the mining truck 10.

Based on information associated with the payload 22 and positioning information provided by the positioning system 46, the path plan 66 may be generated by the mining truck controller 26 and thereafter implemented to control the mining truck 10. For example, the path plan 66, as shown utilized in FIG. 4, has directed the mining truck 10 to turn such that the off-center, center of mass 70 will be on an uphill side 74 of the work site 14 rather than a downhill side 76 of the work site 14. For the purposes of this example, the uphill side 74 and the downhill side 76 are divided by the center line 72. By positioning the mining truck 10 in such a manner during a turn, gravitational forces on the payload 22 may aid in preventing tipping of the mining truck 10 during turning.

INDUSTRIAL APPLICABILITY

The present disclosure generally relates to control systems for mining trucks and, more particularly, relates to systems and methods for controlling mining trucks based on imbalance of a payload carried by the mining truck. The foregoing is applicable to large, material moving operations occurring on worksites, performed by vehicles, such as mining trucks, and describes systems and methods that account for payload imbalance in path planning. By using such path planning in controlling the trucks, the trucks will be able to plan efficient paths on the worksite, which may lead to greater haul efficiency.

Figure 4:
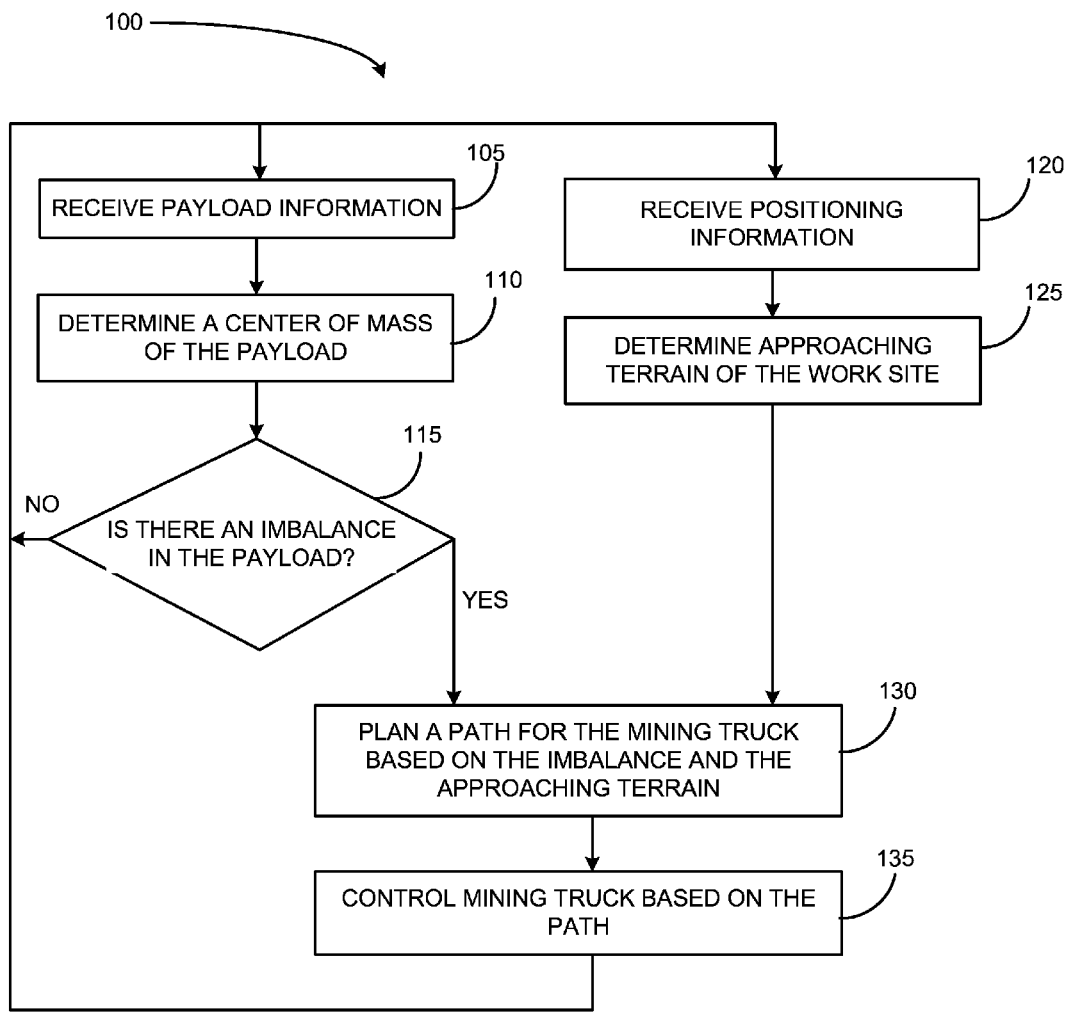
FIG. 4 is a flowchart illustrating a method for and controlling a mining truck, in accordance with an embodiment of the disclosure.

As shown in FIG. 4, a method 100 may utilize the aforementioned control system 12 to control the mining truck 10 by accounting for imbalances in the payload 22. The method may begin at block 105, when the mining truck controller 26 receives payload information associated with the payload 22. The payload information may be gathered from the sensors 34 and, in some examples, may be provided by one or more of the tire pressure sensors 36, the suspension system pressure sensors 38, and the payload monitoring system 40. Using the payload information, the center of mass 70 may then be determined, as shown in block 110. An imbalance of the payload 22 may then be determined based on one or both of the center of mass 70 and the payload information, as shown in block 115. The imbalance of the payload may be determined, for example, based on, or relative to, the center line 72 of the mining truck 10.

The method 100 may also include receiving positioning data associated with the work site 14 from the positioning system 46, as shown in block 120. By utilizing the positioning data, the mining truck controller 26 may determine an approaching terrain of the work site 14 based on said positioning data, as shown in block 125. For example, the approaching terrain may include designations of the uphill portion 74 and the downhill portion 76. Furthermore, determining the approaching terrain of the work site 14 may include determining the actual profile of the work site 14 based on the positioning data.

By using both the determined imbalance of the payload 22 and the determined approaching terrain, the mining truck controller 26 may plan a path for the mining truck 10, as shown in block 130. In some examples, planning the path includes instructions for turning the mining truck 10 such that the center of mass 70 of the payload 22 remains on the uphill portion 74 of the approaching terrain. Additionally or alternatively, planning of the path may include instructions to direct the mining truck 10 to an alternative destination than a previously planned destination. Further, path plans may include instructions for speeds of the mining truck 10 during turns.

Using the planned path, the mining truck controller 26 may control the mining truck 10, as shown in block 135. The mining truck controller 26 may, for example, control the mining truck 10 by actuating one or more of the plurality of actuators 28, which may be operatively associated with one or more of the bed 20, the prime mover 18, and the wheels 16. By using the method 100, the mining truck 10 may be controlled both autonomously and semi-autonomously.

From the foregoing, it will be appreciated that while only certain embodiments have been set forth for the purposes of illustration, alternatives and modifications will be apparent from the above description to those skilled in the art. These and other alternatives are considered equivalents and within the spirit and scope of this disclosure and the appended claims.

What is claimed is:

1. A system for controlling a mining truck travelling on a work site, the system comprising:
  a mining truck including a bed;
  at least one sensor operatively associated with the mining truck and configured to determine payload information associated with a payload carried in the bed of the mining truck;
  a position determining system configured to determine positioning data associated with one or both of the mining truck and the work site; and
  a mining truck controller configured to:
    receive the payload information from the sensors;
    determine an imbalance of the payload based on the payload information;
    receive the positioning data from the positioning system;

determine an approaching terrain of the work site based on the positioning data;
plan a path for the mining truck based on the imbalance and the approaching terrain; and
control the mining truck based on the path.

2. The system of claim 1, further comprising a plurality of actuators operatively associated with the machine, and
wherein controlling the mining truck based on the path includes directing the plurality of actuators to control the mining truck.

3. The system of claim 1, wherein the sensors include, at least, a payload monitoring system that determines the payload information based on pressures on the bed caused by the payload.

4. The system of claim 1, wherein the sensors include, at least, pressure sensors that determine the payload information based on pressure information caused by the payload.

5. The system of claim 1, wherein the mining truck controller is further configured to determine a center of mass of the payload, relative to a center point of the bed of the mining truck, based on the payload information, and
wherein determining the imbalance of the payload is based on the center of mass of the payload.

6. The system of claim 1, further comprising a wireless control link for connecting the mining truck controller to a remote operation for autonomous control of the mining truck.

7. A mining truck, comprising:
a bed;
a prime mover;
a plurality of wheels;
one or more system sensors operatively associated with the mining truck and configured to determine payload information associated with a payload carried in the bed; and
a mining truck controller configured to:
receive the payload information from the sensors;
determine an imbalance of the payload based on the payload information;
receive the positioning data from a positioning system;
determine an approaching terrain of the work site based on the positioning data;
plan a path for the mining truck based on the imbalance and the approaching terrain; and
control the mining truck based on the path.

8. The mining truck of claim 7, further comprising a plurality of actuators operatively associated with one or more of the bed, the prime mover, and the plurality of wheels, and
wherein controlling the mining truck based on the path includes directing the plurality of actuators to control one or more of the bed, the prime mover, and the plurality of wheels.

9. The mining truck of claim 7, wherein the sensors include, at least, a payload monitoring system that determines the payload information based on pressures on the bed caused by the payload.

10. A method for controlling a mining truck travelling on a work site, the method comprising:
receiving payload information associated with a payload carried in a bed of the mining truck from sensors associated with the mining truck;
determining an imbalance of the payload based on the payload information;
receiving positioning data associated with the work site from a positioning system;
determining an approaching terrain of the work site based on the positioning data;
electronically planning a path for the mining truck based on the imbalance and the approaching terrain; and
controlling the mining truck based on the path.

11. The method of claim 10, further comprising determining a center of mass of the payload, relative to a center point of the bed of the mining truck, based on the payload information, and
wherein determining the imbalance of the payload is based on the center of mass of the payload.

12. The method of claim 10, wherein determining the approaching terrain includes determining an actual profile of the work site based on the positioning data associated with the work site, and
wherein planning a path for the mining truck is further based on the actual profile of the work site.

13. The method of claim 10, wherein determining the approaching terrain of the work site based on the positioning data includes determining an uphill portion of the approaching terrain.

14. The method of claim 13, wherein planning the path for the mining truck based on the imbalance and the approaching terrain further includes planning the path to include turning the mining truck such that a center of mass of the payload remains on the uphill portion of the approaching terrain.

15. The method of claim 10, wherein receiving payload information associated with the payload from the sensors further includes receiving payload information from a payload monitoring system configured to detect pressures on the bed caused by the payload.

16. The method of claim 10, wherein receiving payload information associated with the payload from the sensors further includes receiving payload information from pressure sensors configured to determine pressure information caused by the payload.

17. The method of claim 10, wherein planning the path for the mining truck based on the imbalance and the approaching terrain further includes planning the path to direct the mining truck to an alternative destination.

18. The method of claim 10, further comprising planning a turning speed for a turn of the path, and
wherein controlling the mining truck is further based on the turning speed for the turn.

19. The method of claim 10, wherein controlling the mining truck based on the path includes autonomously controlling the mining truck.

20. The method of claim 10, wherein controlling the mining truck based on the path includes semi-autonomously controlling the mining truck.

* * * * *